United States Patent
Ikeda et al.

(10) Patent No.: US 11,523,025 B2
(45) Date of Patent: Dec. 6, 2022

(54) IMAGE PROCESSING APPARATUS THAT DISPLAYS A MESSAGE INDICATING THAT ALTERATION OF A LOGIN APPLICATION HAS BEEN DETECTED, CONTROL METHOD THEREOF, AND STORAGE MEDIUM

(71) Applicant: CANON KABUSHIKI KAISHA, Tokyo (JP)

(72) Inventors: Atsushi Ikeda, Toride (JP); Takeshi Kogure, Toride (JP); Hiroaki Koike, Kokubunji (JP); Naoto Sasagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/130,187

(22) Filed: Dec. 22, 2020

(65) Prior Publication Data

US 2021/0152709 A1 May 20, 2021

Related U.S. Application Data

(63) Continuation of application No. 16/458,868, filed on Jul. 1, 2019, now Pat. No. 10,904,405.

(30) Foreign Application Priority Data

Jul. 10, 2018 (JP) .............................. JP2018-130887

(51) Int. Cl.
*G06F 21/31* (2013.01)
*H04N 1/32* (2006.01)
(52) U.S. Cl.
CPC ......... *H04N 1/32379* (2013.01); *G06F 21/31* (2013.01)

(58) Field of Classification Search
CPC ........... H04N 1/32379; H04N 1/00037; H04N 1/0009; H04N 1/00938; G06F 21/31; G06F 21/608; G06F 21/52; G06F 21/44
See application file for complete search history.

(56) References Cited

U.S. PATENT DOCUMENTS 6,367,012 B1 4/2002 Atkinson
7,707,427 B1 4/2010 Kenrich
(Continued)

FOREIGN PATENT DOCUMENTS

CN 103312887 A 9/2013
CN 103679029 A 3/2014
(Continued)

OTHER PUBLICATIONS

Copending, Unpublished, U.S. Appl. No. 16/503,782, to Hiroaki Koike, et al., filed Jul. 5, 2019.
Singapore Search Report dated May 28, 2020 in corresponding Singapore Patent Application No. 10201905864W.
(Continued)

*Primary Examiner* — Juan M Guillermety
(74) *Attorney, Agent, or Firm* — Venable LLP

(57) ABSTRACT

The present invention provides an image processing apparatus comprising detecting alteration of any application held in the image processing apparatus; determining, in a case where alteration has been detected, whether or not the use of the image processing apparatus needs to be restricted based on the application in which alteration has been detected; and displaying, in a display unit and as a result of the determination, in a case where the use of the image processing apparatus needs to be restricted, a message indicating that alteration of the application has been detected, and restricting the use of the image processing apparatus, and in a case where the use of the image processing apparatus need not be
(Continued)

restricted, display, in the display unit, a message indicating that alteration of the application has been detected.

26 Claims, 10 Drawing Sheets

(56) References Cited

U.S. PATENT DOCUMENTS

| | | |
|---|---|---|
| 8,854,659 B2 | 10/2014 | Koike |
| 9,032,481 B2 | 5/2015 | Ikeda |
| 2002/0059570 A1* | 5/2002 | Yoo .................. G06F 8/60 717/170 |
| 2003/0188174 A1 | 10/2003 | Zisowski |
| 2007/0282893 A1 | 12/2007 | Smith et al. |
| 2009/0307499 A1 | 12/2009 | Senda |
| 2010/0042850 A1* | 2/2010 | Niinuma ............ G06F 21/32 713/186 |
| 2010/0162352 A1* | 6/2010 | Haga ................. G06F 21/51 726/2 |
| 2011/0311046 A1* | 12/2011 | Oka ................... G06F 21/51 380/243 |
| 2014/0156943 A1 | 6/2014 | Sato |
| 2014/0237566 A1* | 8/2014 | Enache ............... G06F 21/46 726/6 |
| 2017/0244866 A1 | 8/2017 | Kano |
| 2018/0048776 A1 | 2/2018 | Kogure |
| 2018/0146117 A1 | 5/2018 | Oya |
| 2019/0034624 A1 | 1/2019 | Chen et al. |
| 2020/0021692 A1* | 1/2020 | Koike et al. ...... H04N 1/00037 |

FOREIGN PATENT DOCUMENTS

| | | |
|---|---|---|
| JP | 2007226277 A | 9/2007 |
| JP | 2009-193528 A | 8/2009 |
| JP | 2012-078953 A | 4/2012 |
| JP | 2013101560 A | 5/2013 |
| JP | 2015-069403 A | 4/2015 |
| JP | 2018-079675 A | 5/2018 |

OTHER PUBLICATIONS

Chinese Office Action dated Sep. 3, 2021 in counterpart Chinese Patent Appln. No. 201910611795.2.

Japanese Office Action dated Apr. 1, 2022 in counterpart Japanese Patent Appln. No. 2018-130887.

* cited by examiner

IMAGE PROCESSING APPARATUS THAT DISPLAYS A MESSAGE INDICATING THAT ALTERATION OF A LOGIN APPLICATION HAS BEEN DETECTED, CONTROL METHOD THEREOF, AND STORAGE MEDIUM

This is a continuation of U.S. patent application Ser. No. 16/458,868, filed Jul. 1, 2019.

BACKGROUND OF THE INVENTION

Field of the Invention

The present invention relates to an image processing apparatus, a control method thereof, and a storage medium.

Description of the Related Art

A technology is proposed in Japanese Patent Laid-Open No. 2007-226277 in which, when alteration of a program is detected in a virtual machine, the program is immediately stopped. Also, in Japanese Patent Laid-Open No. 2013-101560, a login application is proposed in which only an authenticated user is permitted to use the apparatus. Moreover, a technique is also proposed in which, when the login application cannot be started due to a failure or the like, the login application is retreated to a memory, and another login application is overwrite-installed, or a default login application is executed.

However, the above-mentioned known technologies have the following problems. For example, as in the above-mentioned known technologies, if a program that has been altered is simply immediately stopped, the following problems will incur. That is, if alteration of a program of a login application is detected, and the login program is immediately stopped, because restriction by authentication is no longer performed, the apparatus can be freely used. Also, in a low cost image processing apparatus that includes a storage of a limited capacity, it is difficult to prepare another login application in the storage assuming that a predetermined login application will not function, from a viewpoint of a memory resource.

SUMMARY OF THE INVENTION

The present invention enables realization of a mechanism for controlling an apparatus by switching the restriction on the use of the apparatus according to the attribute of an altered application and the position at which alteration has been performed.

One aspect of the present invention provides an image processing apparatus comprising: a memory device that stores a set of instructions; and at least one processor that executes the set of instructions to: detect alteration of any application held in the image processing apparatus; determine, in a case where alteration has been detected, whether or not the use of the image processing apparatus needs to be restricted based on the application in which alteration has been detected; and display, in a display unit and as a result of the determination, in a case where the use of the image processing apparatus needs to be restricted, a message indicating that alteration of the application has been detected, and restrict the use of the image processing apparatus, and in a case where the use of the image processing apparatus need not be restricted, display, in the display unit, a message indicating that alteration of the application has been detected.

Another aspect of the present invention provides a control method of an image processing apparatus comprising: detecting alteration of any application held in the image processing apparatus; determining, in a case where alteration has been detected in the detecting, whether or not the use of the image processing apparatus needs to be restricted based on the application in which alteration has been detected; displaying, in a display unit and as a result of determination in the determining, in a case where the use of the image processing apparatus needs to be restricted, a message indicating that alteration of the application has been detected, and restricting the use of the image processing apparatus, and in a case where the use of the image processing apparatus need not be restricted, displaying, in the display unit, a message indicating that alteration of the application has been detected.

Still another aspect of the present invention provides a non-transitory computer-readable storage medium storing a computer program for causing a computer to executes steps of a control method of an image processing apparatus, the control method comprising: detecting alteration of any application held in the image processing apparatus; determining, in a case where alteration has been detected in the detecting, whether or not the use of the image processing apparatus needs to be restricted based on the application in which alteration has been detected; displaying, in a display unit and as a result of determination in the determining, in a case where the use of the image processing apparatus needs to be restricted, a message indicating that alteration of the application has been detected, and restricting the use of the image processing apparatus, and in a case where the use of the image processing apparatus need not be restricted, displaying, in the display unit, a message indicating that alteration of the application has been detected.

Yet still another aspect of the present invention provides an image processing apparatus comprising: a memory device that stores a set of instructions; and at least one processor that executes the set of instructions to: detect alteration of a login application held in the image processing apparatus, and display, in a display unit and in response to detection of alteration of a login application, a message indicating that alteration of the login application has been detected, and restrict the use of the image processing apparatus.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that a multi-function peripheral (digital MFP/MFP) will be described as an example of the image processing apparatus according to the embodiments. However, the application range is not limited to the MFP, and the apparatus to which the present invention can be applied need only include an image processing function.

First Embodiment

Configuration of an Image Reading Apparatus

Hereinafter, a first embodiment of the present invention will be described with reference to the attached drawings. First, the hardware configuration of an MFP in the present embodiment will be described with reference to FIG. 1.

Figure 1:
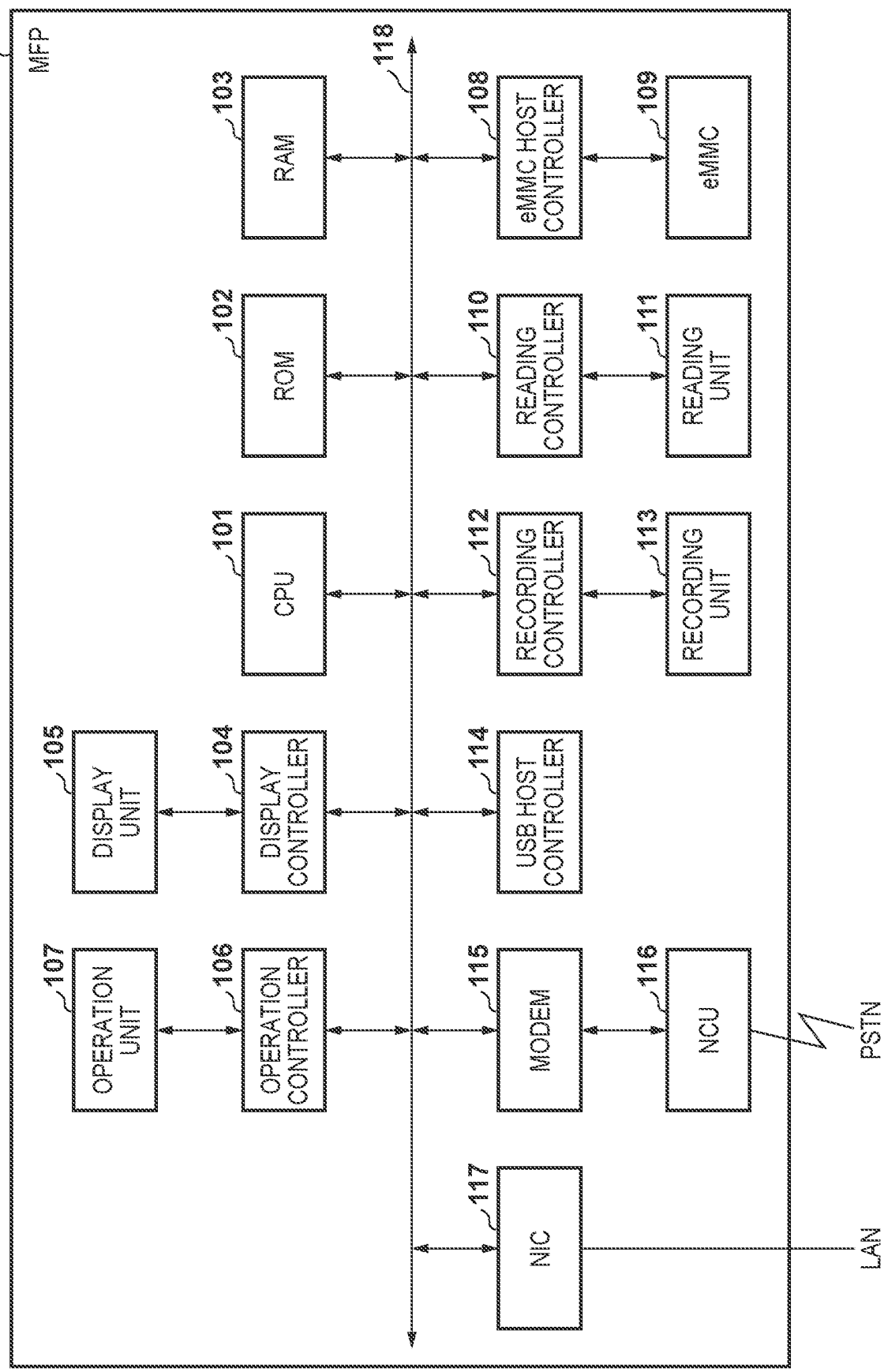
FIG. 1 is a block diagram illustrating a hardware configuration of an MFP according to one embodiment.

As shown in FIG. 1, an MFP 10 includes a CPU 101, a ROM 102, a RAM 103, a display controller 104, a display unit 105, an operation controller 106, and an operation unit 107. Also, the MFP 10 includes an eMMC host controller 108, an eMMC 109, a reading controller 110, a reading unit 111, a recording controller 112, and a recording unit 113. Moreover, the MFP 10 includes a USB host controller 114, a modem 115, a network control unit (NCU) 116, and a network interface card (NIC) 117.

The CPU 101 performs overall control on the devices that are connected to the system bus 118. The CPU 101, upon being supplied with power, executes a boot program stored in the ROM 102. Usually, the boot program loads a main program saved in a specific region of the eMMC 109 to the RAM 103, and sets the pointer at the head of the loaded main program. The RAM 103 functions not only as a location to which the main program is loaded, but also as a work area of the main program and the like. The CPU 101 controls switching between screen displays shown in FIGS. 4 to 7, by executing control programs described in later-described FIGS. 8 to 11.

The display controller 104 controls rendering with respect to the display unit 105. The display unit 105 is a full bit map LCD of a WVGA size. On the other hand, the operation controller 106 controls inputs from the operation unit 107 provided in the MFP 10. The operation unit 107 is constituted by a touch panel that is overlaid on the display unit 105.

The reading unit 111 performs reading of a document. The reading unit 111 is provided with an automatic document feeder (illustration omitted) as an option, and can automatically read a plurality of sheets of a document while conveying the sheets one by one. The reading unit 111 is connected to the reading controller 110, and the CPU 101 can exchange information with the reading unit 111 via the reading controller 110.

Also, the recording unit 113 forms an image on a recording sheet using an electrographic method. The recording sheets in the present embodiment include sheets on whose surfaces images are to be formed. The recording unit 113 is connected to the recording controller 112, and the CPU 101 exchanges information with the recording unit 113 via the recording controller 112.

The USB host controller 114 performs USB protocol control, and mediates access to a USB device such as a USB memory (illustration omitted). The modem 115 performs modulation/demodulation of signals necessary for facsimile communication. Also, the modem 115 is connected to the NCU (network control unit) 116. The signals modulated by the modem 115 are transmitted to a public network (PSTN) via the NCU 116.

The NIC (Network Interface Card) 117 bidirectionally transmits and receives data to and from mail and file servers and the like via a LAN. Also, the NIC 117 bidirectionally transmits and receives data to and from a Web server and the like. The MFP 10 of the present embodiment includes the eMMC 109 as storage. The CPU 101 accesses the eMMC 109 via the eMMC host controller 108.

Software Configuration

Figure 2:
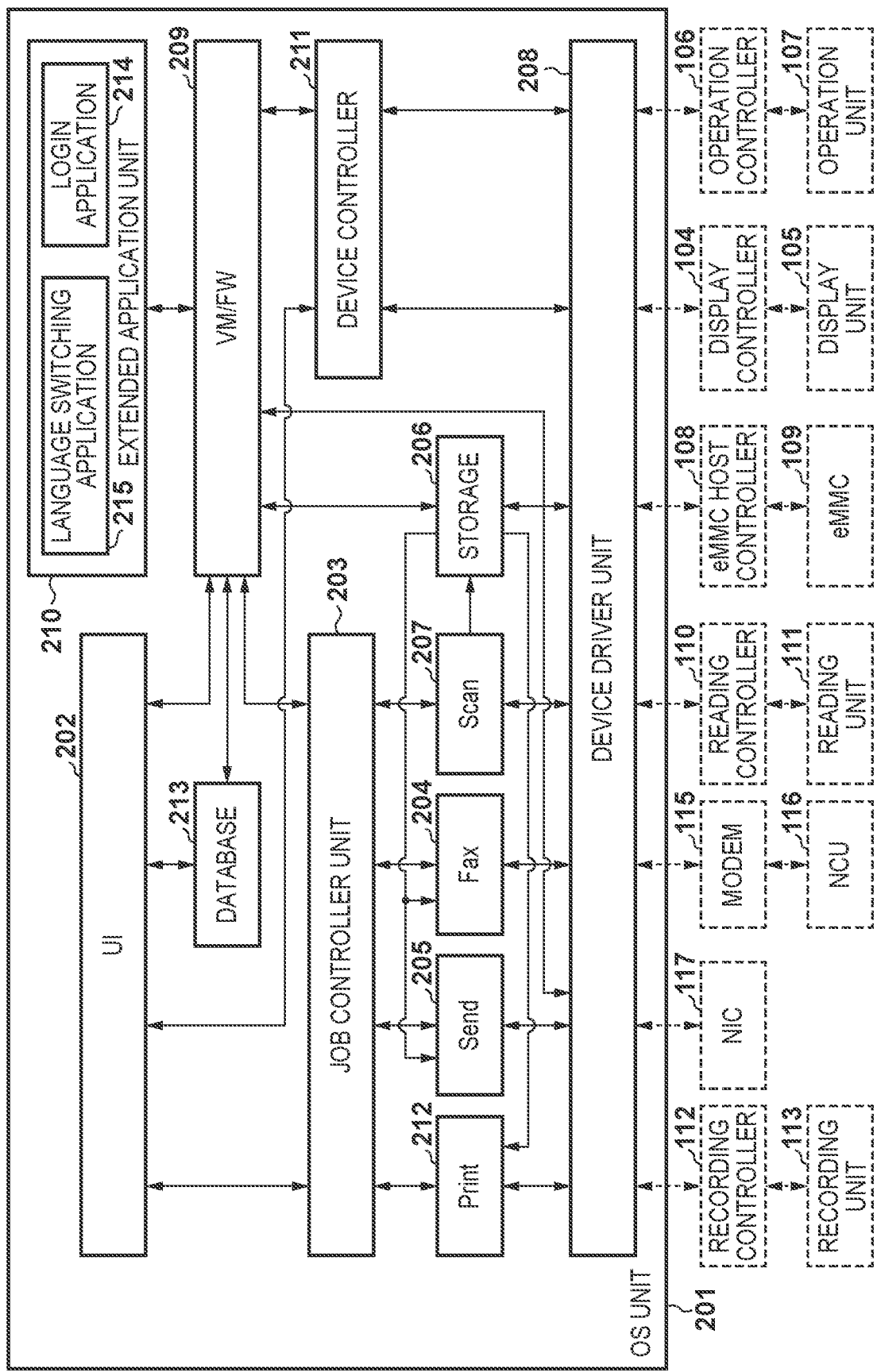
FIG. 2 is a block diagram illustrating a software configuration of an MFP according to one embodiment.

Next, the software configuration of the MFP 10 according to the present embodiment will be described with reference to FIG. 2. The units indicated by the solid lines in FIG. 2 are software modules that can be realized by the CPU 101 executing the main program loaded to the RAM 103 using the aforementioned boot program.

The main program manages/controls execution of later-descried modules with an OS (Operating System) unit 201. A device driver unit 208 is included in the OS unit 201. The device driver unit 208 mediates exchange of information with hardware devices such as the display controller 104, the operation unit controller 106, and the reading controller 110.

A UI (User Interface) unit 202 provides various types of information to a user via the display unit 105 and accepts various types of instructions made on the operation unit 107 by the user. Various settings for switching the behavior of the MFP 10 can be changed through the UI unit 202. The various settings changed through the UI unit 202 are physically stored in the eMMC 109 via a database unit 213. The setting of a display language that can be changed through the UI unit 202 is one of the various settings.

A job controller unit 203 accepts jobs such as copy, print, FAX, and transmission, and controls execution of the accepted job via the functional units such as a printer unit 212, a sender unit 205, a FAX unit 204, and a scanner unit 207. The storage unit 206 is a software module for physically storing an image that is transmitted or received by facsimile and data such as application settings requested by an extended application unit 210 to the eMMC 109 and managing these pieces of data.

For example, in the MFP 10 of the present embodiment, when the job controller unit 203 has accepted a facsimile transmission job, the scanner unit 207, in response to the job request, scans a document by controlling the reading unit 111. Then, the scanner unit 207 stores the facsimile image data obtained by scanning to the storage unit 206. The facsimile image data stored in the storage unit 206 is read out by the FAX unit 204, and is transmitted through facsimile to the other party via the modem 115 and the NCU 116. Alternatively, the image data received from the other party through facsimile via the modem 115 and the NCU 116 is taken in by the FAX unit 204, and is stored in the storage unit 206.

The MFP 10 of the present embodiment includes a VM (Virtual Machine)/FW (Framework) unit 209. The extended application unit 210 is physically arranged in the eMMC 109, and stores a plurality of applications from any program that is described using a scripting language, and the like. For example, program languages such as Java (registered trademark) and Lua, which are interpreters that interpret and execute bytecodes, may be used.

A VM/FW unit 209 installs any program described using a scripting language or a predetermined high-level language in the extended application unit 210. Alternatively, the VM/FW unit 209 has a function of uninstalling a program from the extended application unit 210. At the same time, the VM/FW unit 209 holds status information of an installed application including information regarding whether or not the application is valid in the storage unit 206. Also, the VM/FW unit 209 has an ability to, if an archive in which a plurality of preinstalled applications are compressed is present in the ROM 102, extract and install a preinstalled application in the extended application unit 210, as necessary. The detailed description thereof is omitted.

Furthermore, the VM/FW unit 209 has a function of arbitrating between a function realized by any program installed in the extended application unit 210 and an existing function, and the like. Also, the VM/FW unit 209, upon a button displayed in the display unit 105 being selected, loads a scripting language of a corresponding application to the RAM 103, and interprets and executes the content thereof. With this, the MFP 10 of the present embodiment can easily realize any function such as a login application 214 or a language switching application 215 while keeping the detachability of functions. Furthermore, the VM/FW unit 209, upon receiving a request from any program installed in the extended application unit 210, refers to and changes the various setting values of the database unit 213.

A UI device controller 211 mediates the output of various types of information to the display unit 105 from the UI unit 202 and the extended application unit 210, and transmitting a user operation to the UI unit 202 and the extended application unit 210 from the operation unit 107.

Data Structure

Figure 3:
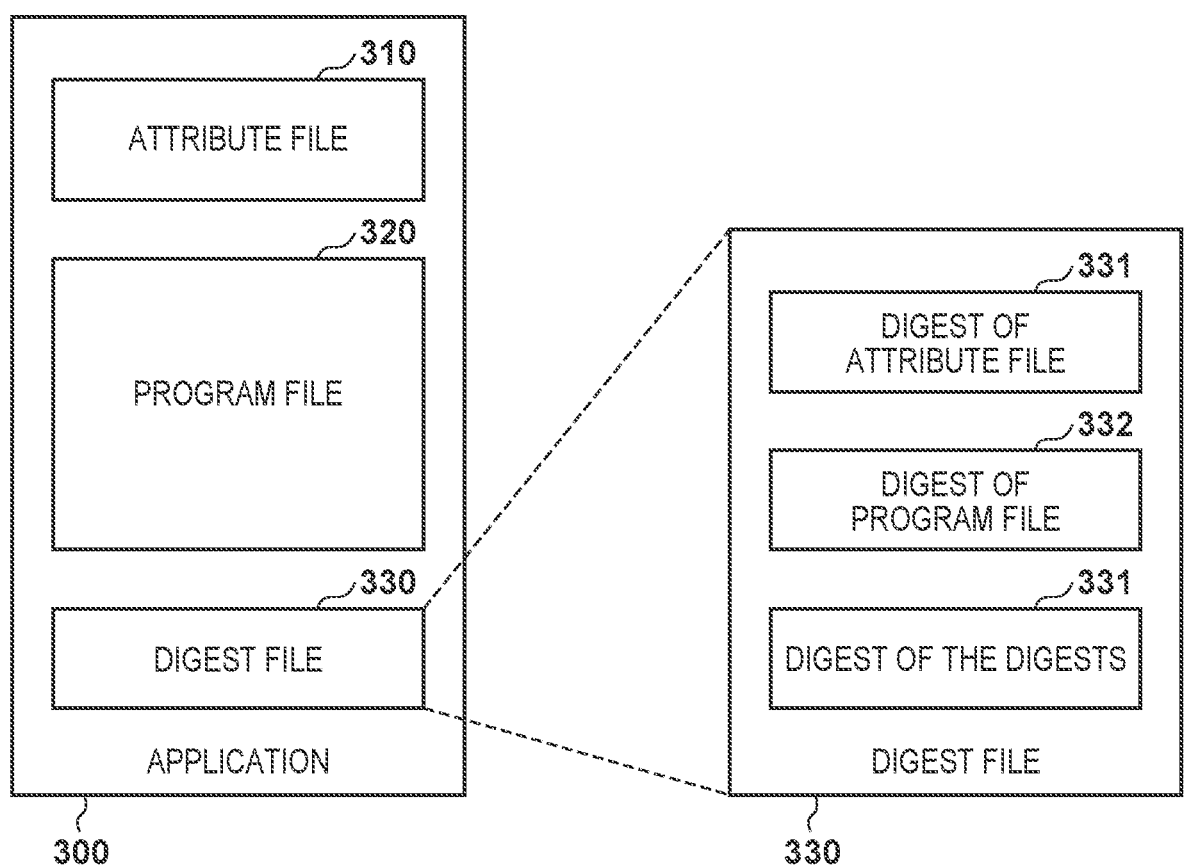
FIG. 3 is a diagram illustrating a data structures of each application of an extended application unit 210 and the data structure of a digest file according to one embodiment.

Next, the data structure of each application and the data structure of a digest file that are saved in the extended application unit 210 according to the present embodiment will be described with reference to FIG. 3.

An application 300 is constituted by an attribute file 310, a program file 320, and a digest file 330. Information (type information) indicating the type of a program included in the application is recorded in the attribute file 310 in addition to the name and version information of the application 300. Specifically, information is recorded with which discrimination is possible between a program having a login function of permitting only an authenticated user to use the MFP 10 and a general-purpose program that is executed in response to the selection of a button displayed in the display unit 105.

The program file 320 stores a program described in an aforementioned scripting language.

The digest file 330 is a file for holding a digest value (hereinafter, also referred to as a hash value) in which alteration is to be detected. Specifically, the digest file 330 includes a digest of an attribute file (first digest) 331, a digest of a program file (second digest) 332, and a digest of the digests 331 and 332 (third digest) 333. A digest value that is expected to be obtained by a hash calculation on the attribute file 310 is recorded in the digest 331 of the attribute file. Similarly, a digest value that is expected to be obtained by a hash calculation on the program file 320 is recorded in the digest 332 of the program file. Moreover, a digest value that is expected to be obtained by a hash calculation on the digest 331 of the attribute file and the digest 332 of the program file is recorded in the digest 333 of the digest.

Alteration Detection

Next, the procedure of subroutine processing for detecting alteration of an application according to the present embodiment will be described with reference to FIG. 8. The detection processing described in the following is a portion of the processing constituting the VM/FW unit 209, and is executed by the CPU 101. Hereinafter, all processing that will be described later will be executed by the CPU 101. The CPU 101 realizes the following processing by reading out a control program stored in a memory such as the ROM 102 to the RAM 103 and executing the control program, for example.

First, in step S801, the VM/FW unit 209 acquires the hash value of the digest 331 of the attribute file and the digest 332 of the program file of the digest file 330 by calculation. Next, in step S802, the VM/FW unit 209 determines whether or not the acquired hash value matches the recorded digest value by comparing the hash value acquired in step S801 and the digest 333 of the digest. If these values match, the VM/FW unit 209 determines that no anomaly is present, and advances the processing to step S803, and if not, the VM/FW unit 209 advances the processing to step S810.

In step S803, the VM/FW unit 209 acquires the hash value of the attribute file 310 by calculation. Next, in step S804, the VM/FW unit 209 determines whether or not the acquired hash value matches the recorded digest value by comparing the hash value acquired in step S803 and the digest 331 of the attribute file. If these values match, the VM/FW unit 209 determines that no anomaly is present, and advances the processing to step S805, and if not, the VM/FW unit 209 advances the processing to step S809.

In step S805, the VM/FW unit 209 acquires the hash value of the program file 320 by calculation. Next, in step S806, the VM/FW unit 209 determines whether or not the acquired hash value matches the recorded digest value by comparing the hash value acquired in step S805 and the digest 332 of the program file. If these values match, the VM/FW unit 209 determines that no anomaly is present, and advances the processing to step S807, and if not, the VM/FW unit 209 advances the processing to step S808.

In step S807, the VM/FW unit 209 returns a result indicating that alteration of the application is not detected, and the application is in a normal state to the caller of the subroutine, and ends the alteration detection processing. On the other hand, if an anomaly is detected in step S806, in step S808, the VM/FW unit 209 returns a result indicating that alteration of the program file is detected to the caller of the subroutine, and ends the alteration detection processing. Also, if an anomaly is detected in step S804, in step S809, the VM/FW unit 209 returns a result indicating that alteration of the attribute file is detected to the caller of the subroutine, and ends the alteration detection processing. Also, if an anomaly is detected in step S802, in step S810, the VM/FW unit 209 returns a result indicating that alteration of the digest file is detected to the caller of the subroutine, and ends the alteration detection processing.

Processing when Apparatus is Started

Next, the flow of processing for application management when the apparatus is started according to the present embodiment will be described with reference to FIG. 9. The processing for application management here is a portion of the processing performed in the VM/FW unit 209, and is executed by the CPU 101. Hereinafter, all processing that will be described later will be executed by the CPU 101. The CPU 101 realizes the following processing by reading out a control program stored in a memory such as the ROM 102 to the RAM 103 and executing the control program, for example.

First, in step S901, the VM/FW unit 209 sets one to a variable i, and performs control such that the subsequent processing is to be executed from a first application installed in the extended application unit 210. Next, in step S902, the VM/FW unit 209 calls the subroutine processing for detecting alteration of an application that has been described using FIG. 8, and executes the subroutine in order to confirm whether or not an $i^{th}$ application installed in the extended application unit 210 is altered.

Then, in step S903, the VM/FW unit 209 determines whether or not the returned value of the alteration detection processing indicates that the digest file is altered. If alteration of the digest file is not detected, the VM/FW unit 209 advances the processing to step S904. On the other hand, if alteration of the digest file is detected, it is not possible to confirm whether or not the attribute file of the application is altered. Here, even if the attribute file has been altered, because the determination in later-described step S909 cannot be properly performed, the VM/FW unit 209 advances the processing to step S912.

In step S904, the VM/FW unit 209 determines whether or not the returned value from the alteration detection processing indicates alteration of the attribute file. If alteration of the attribute file is not detected, the VM/FW unit 209 advances the processing to step S905. On the other hand, if alteration of the attribute file is detected, because the determination in later-described step S909 cannot be properly performed, the VM/FW unit 209 advances the processing to step S912.

In step S905, the VM/FW unit 209 determines whether or not the returned value from the alteration detection processing indicates alteration of the program file. If alteration of the program file is not detected, the VM/FW unit 209 advances the processing to step S906, and if not, the VM/FW unit 209 advances the processing to step S909. In step S906, the VM/FW unit 209 registers a fact that the $i^{th}$ application is in a normal state in application management data 9000 prepared in the RAM 103, and advances the processing to step S907. Also, the VM/FW unit 209 also registers attribute information of a program included in the $i^{th}$ application in the application management data 9000 at the same time.

Next, in step S907, the VM/FW unit 209 determines whether or not registration of all of the applications installed in the extended application unit 210 has been completed. If the registration has been completed, the VM/FW unit 209 ends the processing of the application registration. On the other hand, if an application that has not been registered yet is present, the VM/FW unit 209 advances the processing to step S908, adds 1 to the variable i, and returns the processing to step S902.

If alteration of the program file has been detected in step S905, in step S909, the VM/FW unit 209 determines whether or not the program has a login attribute by confirming the attribute file of the application. If the program has a login attribute, the VM/FW unit 209 advances the processing to step S912, and if not, the VM/FW unit 209 advances the processing to step S910.

Figure 4:
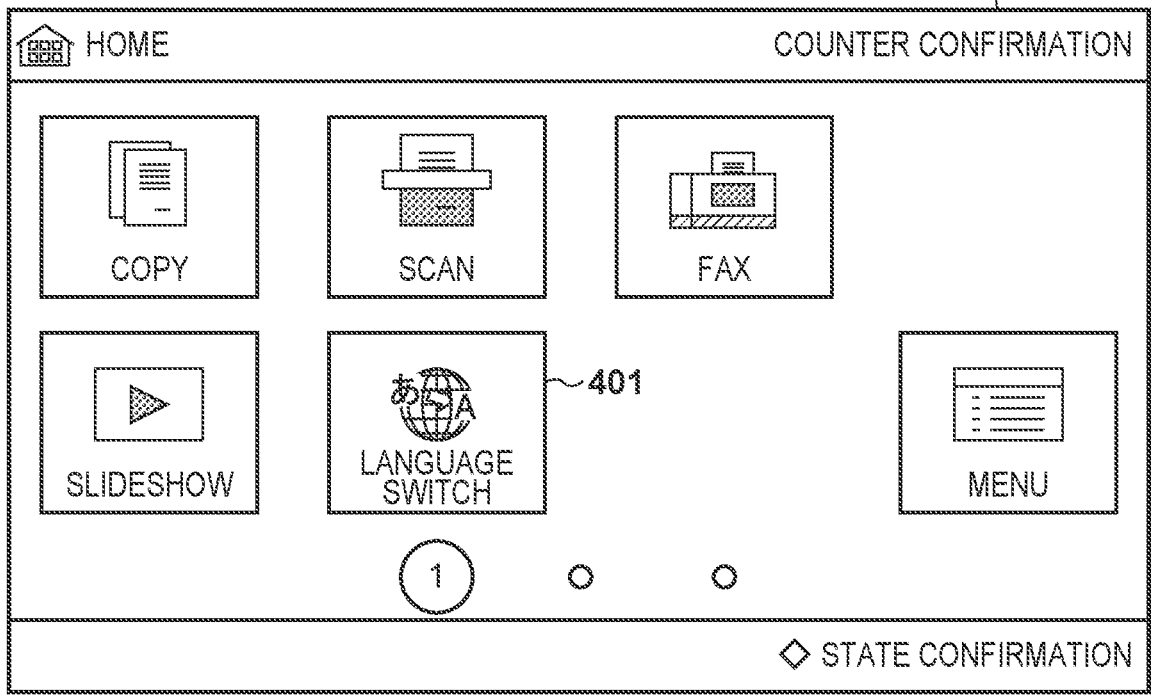
FIG. 4 is a diagram illustrating an example of a home screen that is displayed when an apparatus is started according to one embodiment.
Figure 5:
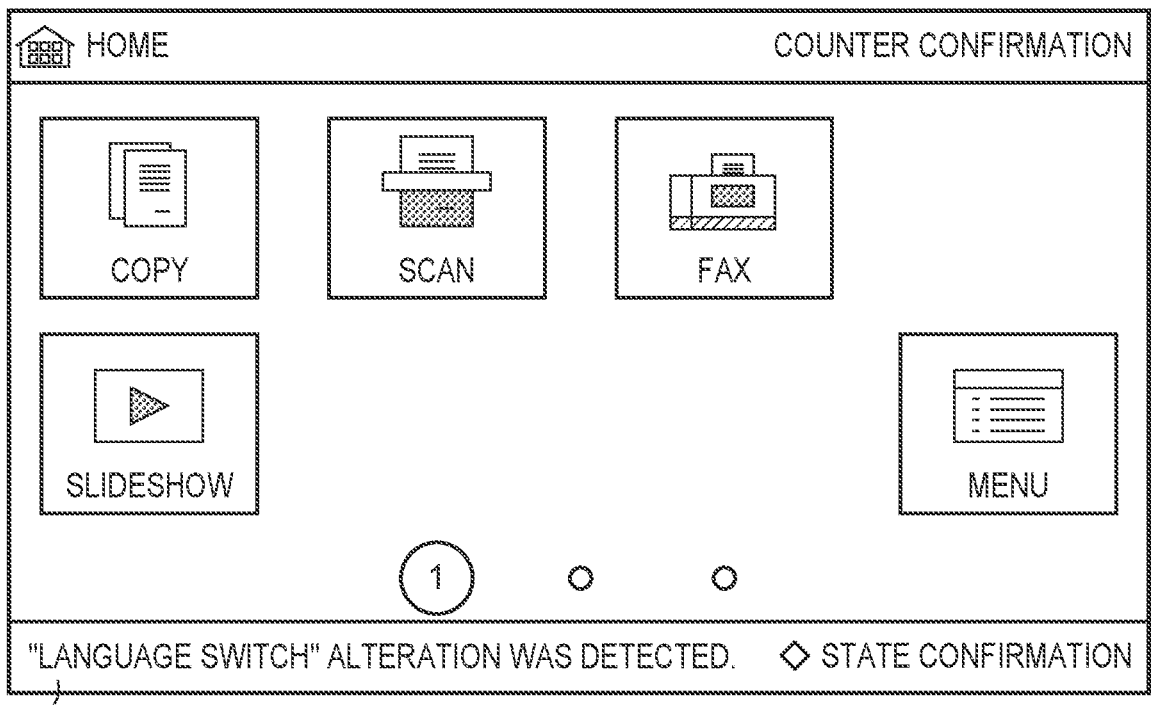
FIG. 5 is a diagram illustrating an example of a screen for displaying a message indicating that alteration of a general-purpose application has been detected according to one embodiment.

In step S910, the VM/FW unit 209 determines whether or not the application is valid by accessing the aforementioned status information of the application. If the application is valid, the VM/FW unit 209 advances the processing to step S911, and if not, because a later-described display need not be performed, the VM/FW unit 209 advances the processing to step S914. In step S911, the VM/FW unit 209 requests the UI unit 202 to perform an error display indicating that a general-purpose application that does not have a login attribute has been altered. An example of the operation screen displayed by the UI unit 202 that has received the request is shown in FIG. 5. The MFP 10 in the present embodiment displays a message indicating that alteration of an application has been detected in a status region 501 allocated at a lower portion of the screen. FIG. 5 shows an example in which such a message is displayed in the status region 501 when alteration of a language switching application 215 has been detected. Here, a button 401 in later-described FIG. 4 is not displayed in the home screen. On the other hand, various buttons are displayed for enabling acceptance of operations to use the other functions of the MFP 10.

If it is determined in step S909 that the altered program has a login attribute, or it is determined in step S903 or S904 that determination of whether or not the altered program has a login attribute cannot be properly performed, the VM/FW unit 209 advances the processing to step S912. In step S912, the VM/FW unit 209 determines whether or not the application is valid by accessing the above-mentioned status information of the application. If the application is valid, the VM/FW unit 209 advances the processing to step S913, and if not, because a later-described display need not be performed, the VM/FW unit 209 advances the processing to step S914.

Figure 7:
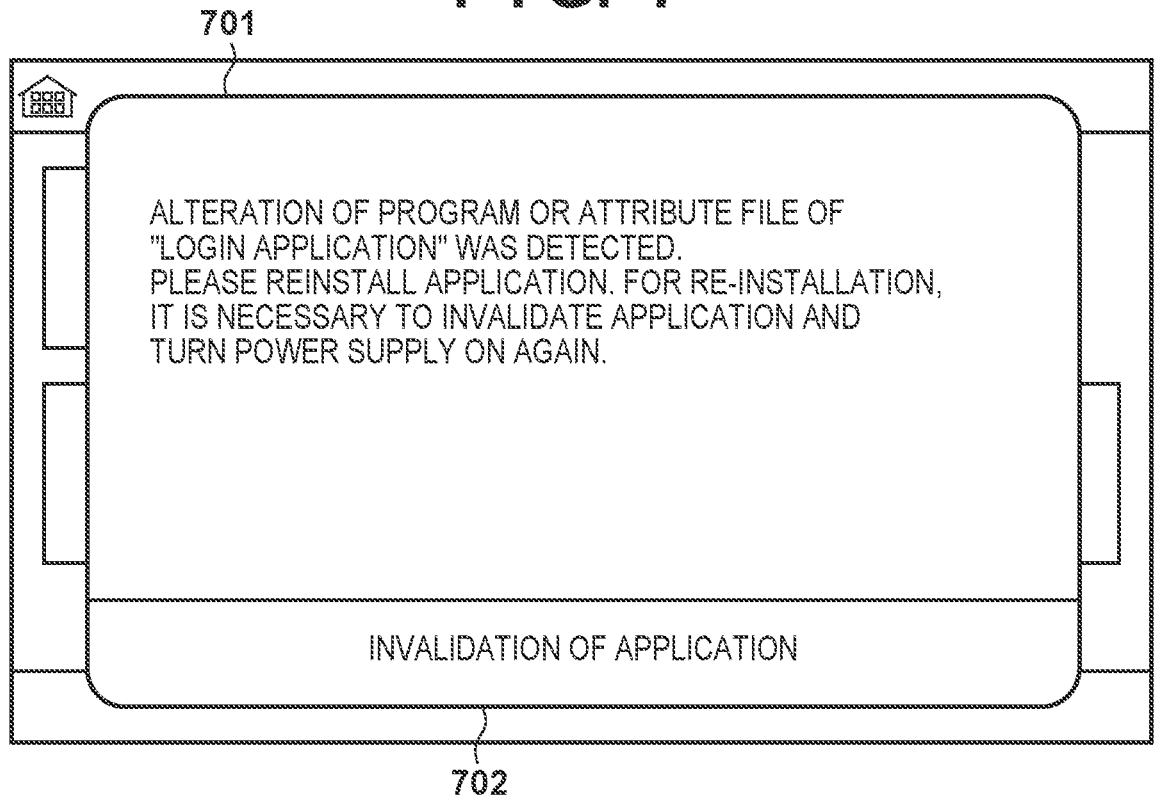
FIG. 7 is a diagram illustrating an example of a pop-up screen of an error display according to one embodiment.

In step S913, the VM/FW unit 209 requests the UI unit 202 to perform an error display indicating that an application having a login attribute has been altered and the use of the apparatus is restricted. An example of the screen displayed by the UI unit 202 that has received the request is shown in FIG. 7. The MFP 10 in the present embodiment restricts the use of the MFP 10 such that the MFP 10 cannot be used and displays a pop-up screen 701 in the display unit indicating that the apparatus cannot be used. Specifically, a message indicating that alteration of the program or attribute file of the login application has been detected, the application needs to be re-installed, and the application needs to be invalidated and the MFP 10 needs to be re-started in order to perform re-installation. Also, when a button 702 for invalidating the application is pressed, a screen for confirming the authority of a system administrator is displayed, and the application can be invalidated only when the authority has been confirmed. Regardless whether or not the application has been invalidated, this screen is continued to be displayed until the power supply is again turned on. With this, the use of the apparatus can be restricted.

In step S914, the VM/FW unit 209 registers that, with respect to an $i^{th}$ application, in addition to the attribute of a program included in the application, the application is in an anomalous state in the application management data 9000 prepared in the RAM 103. Thereafter, the VM/FW unit 209 advances the processing to step S907. The processing in step S907 is as described above.

Processing when Apparatus is Started 2

Figure 11:
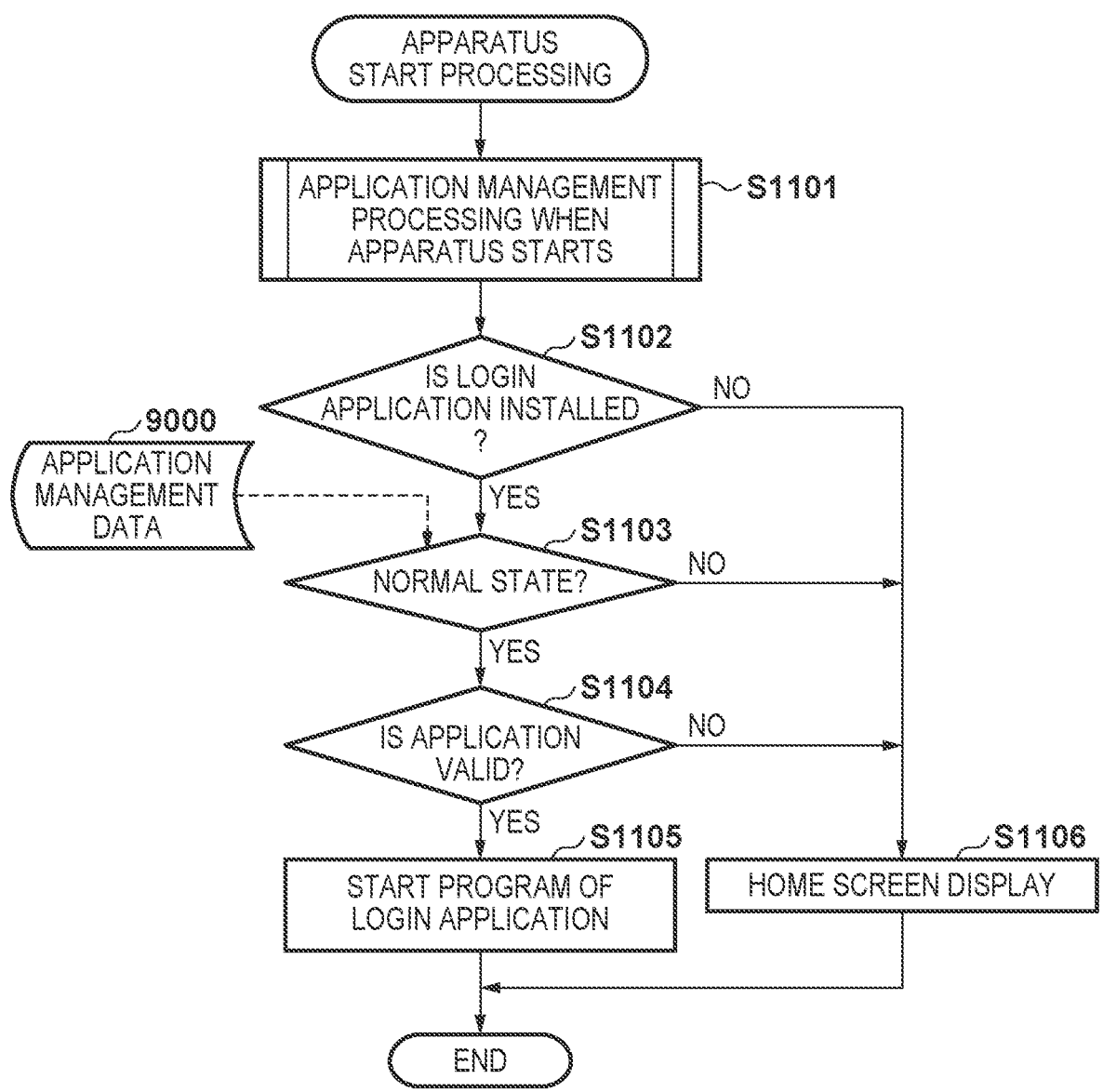
FIG. 11 is a flowchart illustrating a flow of processing performed when the MFP 10 is started according to one embodiment.

Next, the processing procedure when the MFP 10 in the present embodiment is started will be described specifically focusing on the application management and the start of a login application with reference to FIG. 11. Note that, in the flowchart in FIG. 11, the processing of the flowchart in FIG. 9 described above is called in step S1101 and executed. The processing when the MFP 10 is started, here, is a portion of processing performed by the VM/FW unit 209, and is executed by the CPU 101. Hereinafter, all the later-described processing will be executed by the CPU 101. The CPU 101 realizes the following processing by reading out a control program stored in a memory such as the ROM 102 to the RAM 103 and executing the control program, for example.

Figure 9:
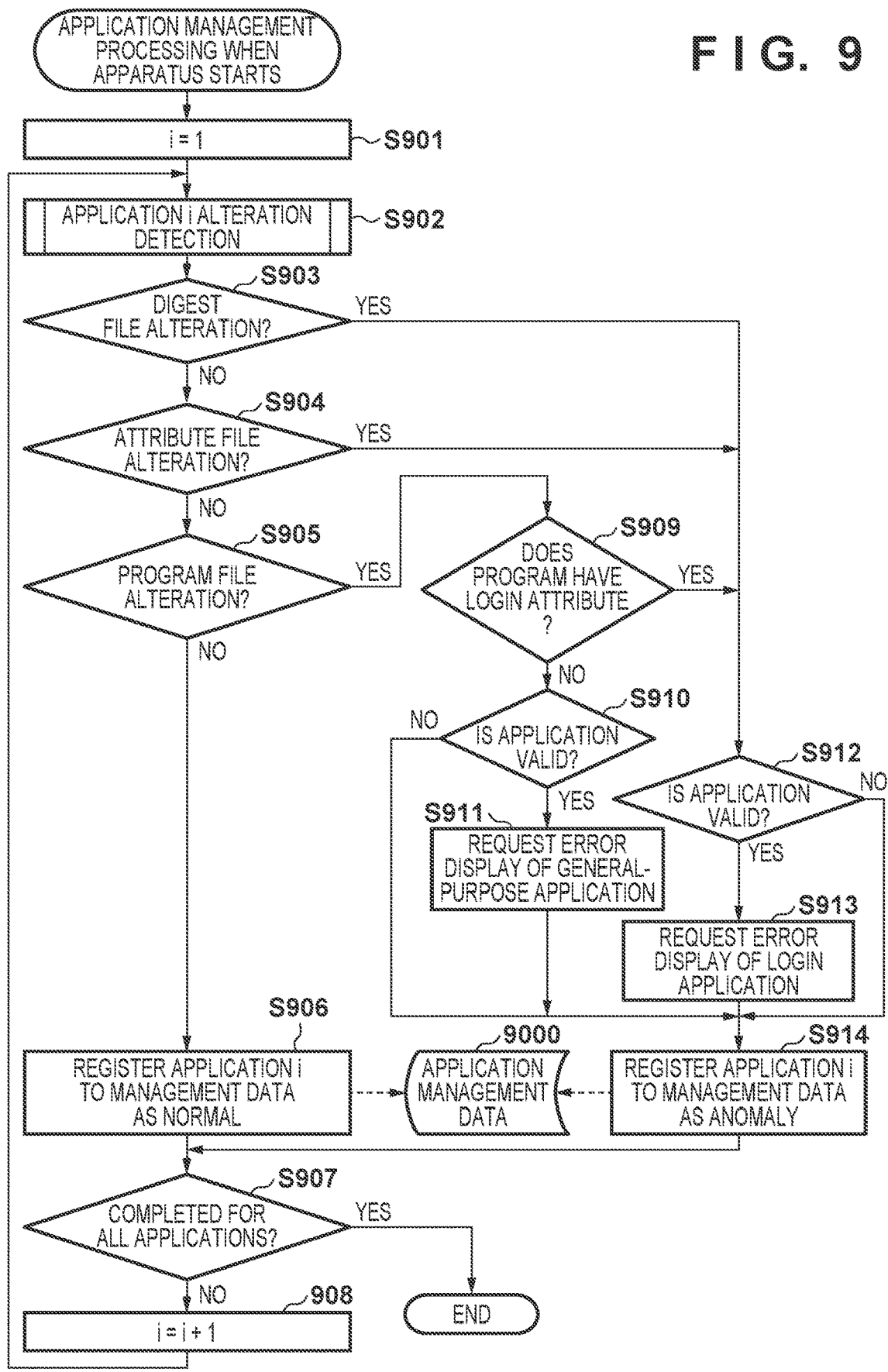
FIG. 9 is a flowchart illustrating a flow of an application management processing when the apparatus is started according to one embodiment.

First, in step S1101, the VM/FW unit 209 executes the processing of the application management described using FIG. 9. Next, in step S1102, the VM/FW unit 209 determines whether or not the login application 214 is installed in the extended application unit 210. If the login application 214 is installed, the VM/FW unit 209 advances the processing to step S1103, and if not, the VM/FW unit 209 advances the processing to step S1106.

Figure 6:
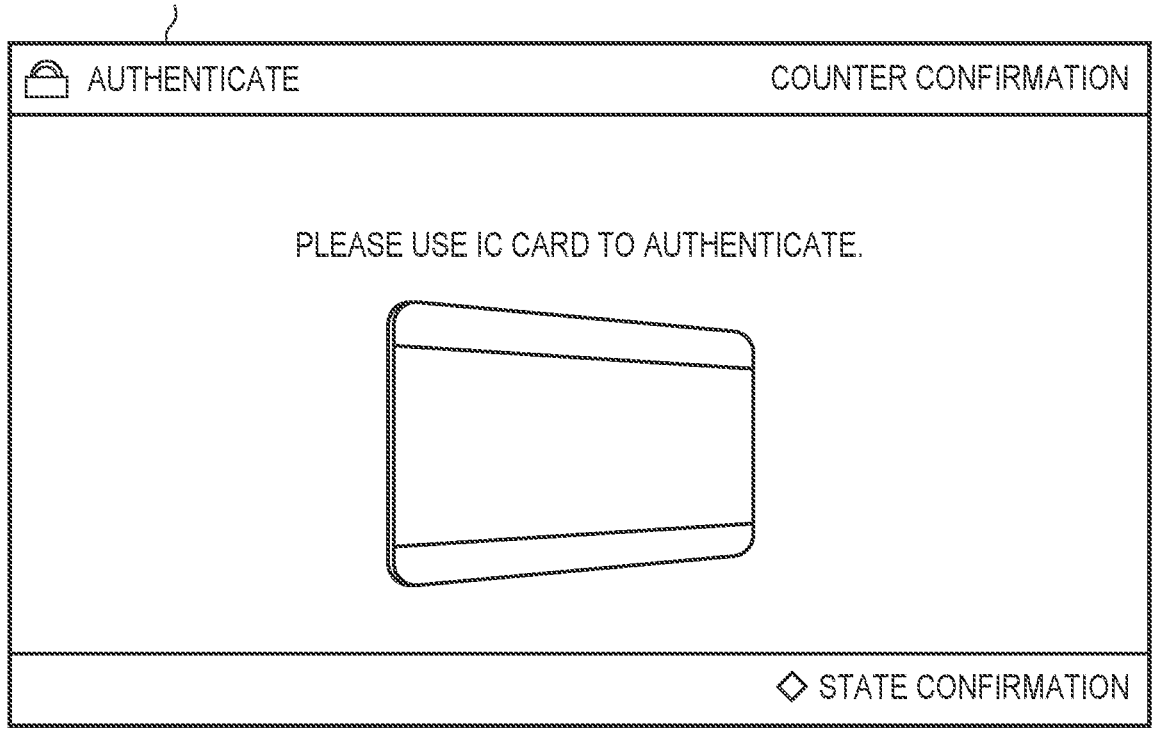
FIG. 6 is a diagram illustrating an example of an authentication screen 601 according to one embodiment.

In step S1103, the VM/FW unit 209 determines whether or not the login application 214 is in a normal state based on the application management data 9000 registered in the processing of the application management. If the login application 214 is in a normal state, the VM/FW unit 209 advances the processing to step S1104, and if not, the VM/FW unit 209 advances the processing to step S1106. In step S1104, the VM/FW unit 209 accesses the aforementioned status information of the application, and determines whether or not the login application 214 is valid. If the login application 214 is valid, the VM/FW unit 209 advances the processing to step S1105, and if not, the VM/FW unit 209 advances the processing to step S1106. In step S1105, the VM/FW unit 209 starts a program having a login attribute that is included in the login application 214, and ends the processing when the apparatus is started. As a result, an authentication screen 601 shown in FIG. 6 is displayed in the display unit 105. The authentication screen 601 shown in FIG. 6 is an example of the authentication screen that is shown when an IC card is used as the authentication method. Note that the present invention is not limited to this, and the control may be performed such that an authentication screen for inputting authentication information (account and password) is displayed, or a screen for using another authentication method is displayed, for example. Various method such as face authentication using a camera or the like and fingerprint authentication can be applied as the other authentication method.

On the other hand, if it is determined that the authentication screen need not be displayed in step S1102, S1103, or S1104, in step S1106, the VM/FW unit 209 displays a home screen (operation screen) 400 shown in FIG. 4 in the display unit 105, and ends the processing when the apparatus is started. In the home screen 400, if a language switching application 215 is installed and the application is valid, a button 401 of the language switching application is displayed in the home screen.

Execution of Extended Application

Figure 10:
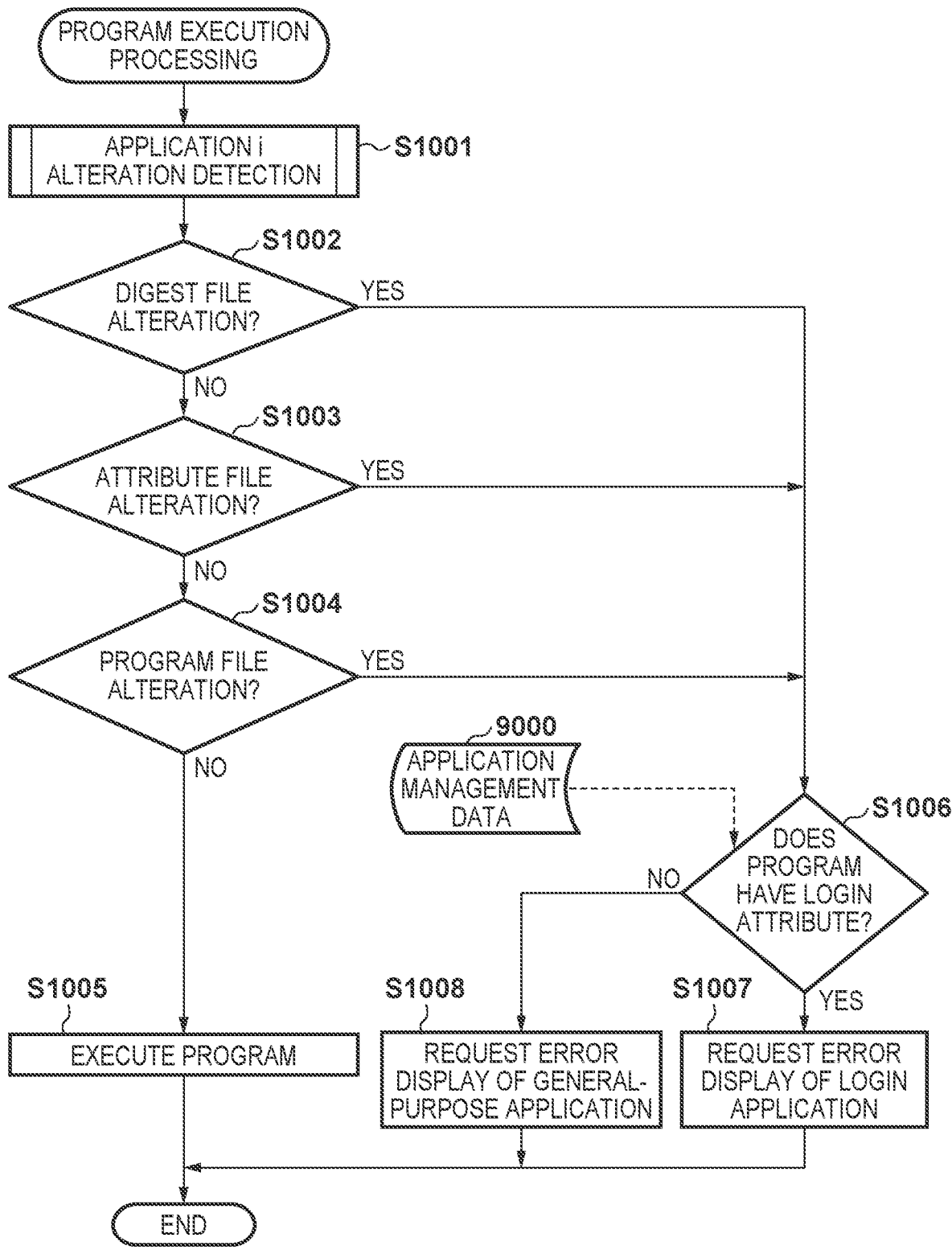
FIG. 10 is a flowchart illustrating a flow of an execution processing of a program of the extended application unit 210 according to one embodiment.

Next, the flow of processing for executing a program included in an application that has been installed in the extended application unit 210 will be described with reference to FIG. 10. The processing for executing a program is executed at a timing when a button of any application displayed in the home screen 400 such as the button 401 is pressed. Alternatively, a program (extended application) is executed at a timing, in step S1105 in FIG. 11 or while the MFP 10 is operating, which is not illustrated, at which the login application 214 is switched from invalid to valid. The detection processing described in the following is a portion of the processing that constitutes the VM/FW unit 209, and is executed by the CPU 101. Hereinafter, all the later-described processing will be executed by the CPU 101. The CPU 101 realizes the following processing by reading out a control program stored in a memory such as the ROM 102 to the RAM 103 and executing the control program, for example.

Figure 8:
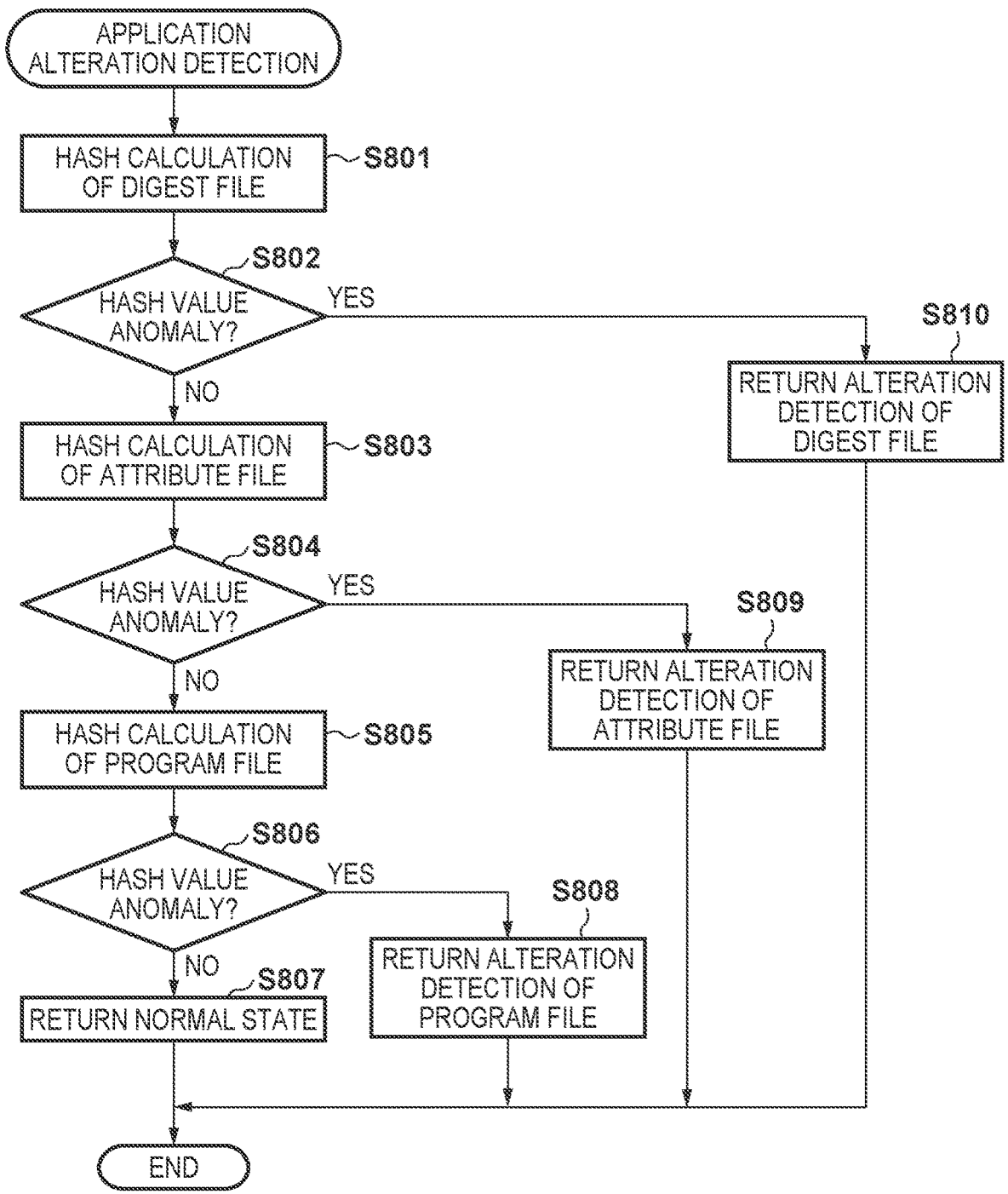
FIG. 8 is a flowchart illustrating a flow of a subroutine processing for detecting alteration of an application according to one embodiment.

First, in step S1001, the VM/FW unit 209 calls subroutine processing for detecting alteration of an application described using FIG. 8, and detects alteration of a program of which execution has been requested. Next, in step S1002, the VM/FW unit 209 determines whether or not the returned value from the alteration detection processing indicates alteration of the digest file. If alteration of the digest file is not detected, the VM/FW unit 209 advances the processing to step S1003. On the other hand, if alteration of the digest file is detected, the VM/FW unit 209 advances the processing to step S1006.

In step S1003, the VM/FW unit 209 determines whether or not the returned value from the alteration detection processing indicates alteration of the attribute file. If alteration of the attribute file is not detected, the VM/FW unit 209 advances the processing to step S1004. On the other hand, if alteration of the attribute file is detected, the VM/FW unit 209 advances the processing to step S1006. In step S1004, the VM/FW unit 209 determines whether or not the returned value from the alteration detection processing indicates alteration of the program file. If alteration of the program file is not detected, the VM/FW unit 209 advances the processing to step S1005, and if not, the VM/FW unit 209 advances the processing to step S1006.

In step S1005, the VM/FW unit 209 executes the requested program, and ends the program execution processing. On the other hand, if alteration of the file has been detected in step S1002, S1003, or S1004, the VM/FW unit 209 advances the processing to step S1006, and determines the attribute of the requested program. Here, the attribute of the program has been registered in the application management data 9000 in step S906 or S914, as described above. Therefore, even if the digest file or the attribute file has been altered, the attribute of the program can be specified, in step S1006, using the application management data 9000. If the program has a login attribute, the VM/FW unit 209 advances the processing to step S1007, and if not, the VM/FW unit 209 advances the processing to step S1008.

In step S1007, the VM/FW unit 209 requests the UI unit 202 to perform an error display indicating that an application having a login attribute has been altered and the use of the apparatus is restricted, similarly to step S913 described above. The UI unit 202 that has received the request also displays the pop-up screen 701 indicating that the apparatus cannot be used, similarly to step S913 described above. Then the VM/FW unit 209 ends the program execution processing.

On the other hand, in step S1008, the VM/FW unit 209 requests the UI unit 202 to perform an error display indicating that a general-purpose application that does not have a login attribute has been altered, similarly to step S911 described above. The UI unit 202 that has received the request displays a message indicating that alteration of the application has been detected as in the status region 501 shown in FIG. 5, similarly to step S911 described above. Then, the VM/FW unit 209 ends the program execution processing.

As described above, the image processing apparatus according to the present embodiment detects alteration of any application held by the image processing apparatus, and determines whether or not the use of the image processing apparatus needs to be restricted based on the application in which alteration has been detected. Furthermore, if the use of the image processing apparatus needs to be restricted as a result of the determination, the image processing apparatus displays a message indicating that alteration of the application has been detected in the display unit, and restricts the use of the image processing apparatus. On the other hand, if the use of the image processing apparatus need not be restricted, the image processing apparatus displays a message indicating that alteration of the application has been detected in the display unit. Note that the case where the use of the image processing apparatus needs to be restricted is a case where, if the application is stopped, the image processing apparatus can be freely used as in a case where the login application has been altered, for example. Also, according to the present embodiment, it is determined that the use of the image processing apparatus needs to be restricted in also a case where the information (attribute file or digest file) for determining such a login attribute or the like has been altered. Accordingly, if the program of an altered application has a login attribute, or if the attribute cannot be determined, an error message indicating that alteration has been detected is displayed, the use of the MFP 10 is restricted, and the malicious use can be restricted. On the other hand, if the program of an altered application does not have a login attribute, although a warning is displayed in the status region 501, the MFP 10 can be controlled so as to be continuously used, and the usability can be improved. That is, according to the present embodiment, the apparatus can be controlled such that the restriction to use the apparatus is switched according to the attribute of an altered application and the position at which the alteration has been performed.

OTHER EMBODIMENTS

In the first embodiment described above, alteration detection has not been performed on status information of applications including information indicating whether or not the installed applications are valid or invalid, the status information being held in the storage unit 206. However, if a configuration is adopted in which alteration can be detected with respect to the status information, the image processing apparatus becomes more robust. Specific example is as follows.

Figure 12:
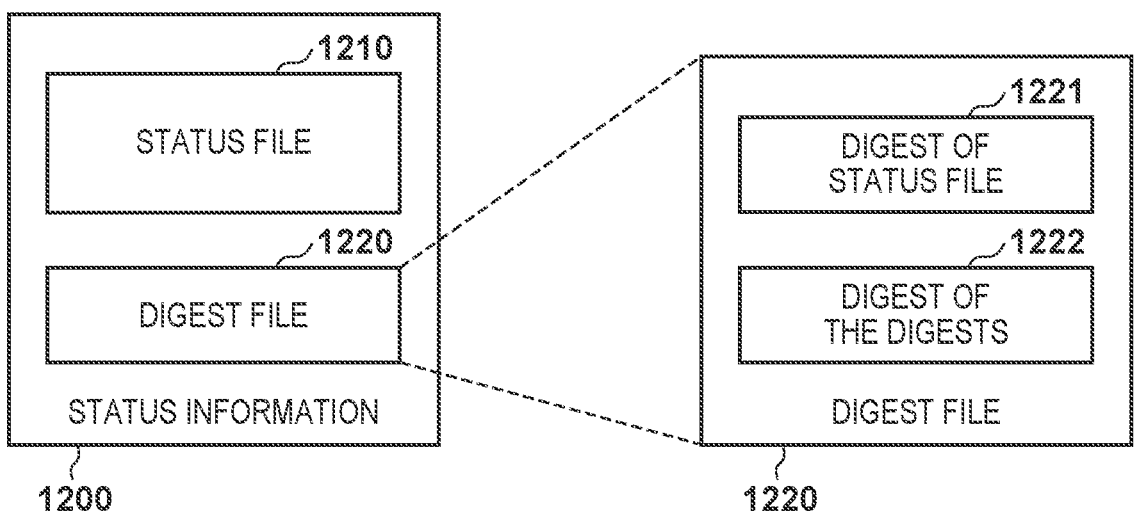
FIG. 12 is a diagram illustrating a data structure of a status information 1200 according to one embodiment.
Figure 13:
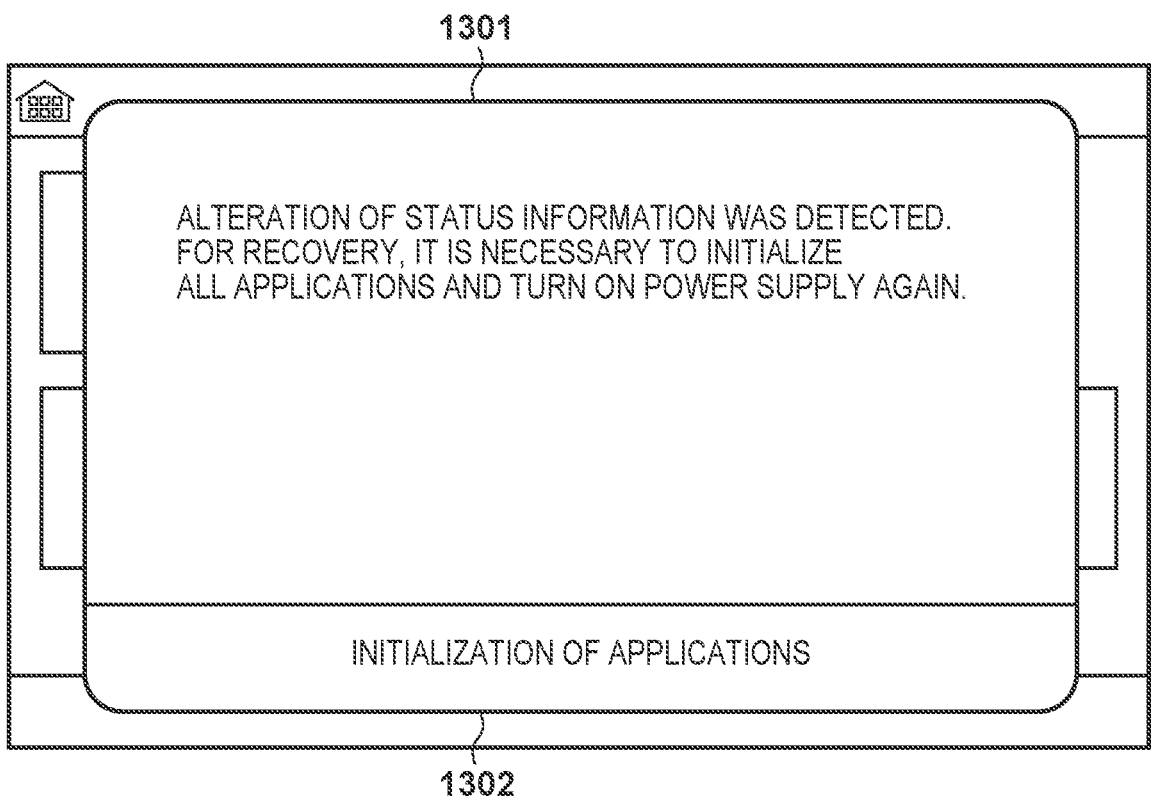
FIG. 13 is a diagram illustrating an example of a pop-up screen of an error display according to one embodiment.

First, as shown in FIG. 12, the status information 1200 includes a status file 1210 and a digest file 1220. Also, the digest file 1220 includes a digest 1221 of the status file and a digest 1222 of the digest. The method of detecting alteration of the status information is similar to the processing from step S801 to step S804 in FIG. 8. The alteration of the digest file 1220 is detected by determining whether or not the hash value of the digest 1221 of the status file matches the digest 1222 of the digest. Also, the alteration of the status file 1210 is detected by determining whether or not the hash value of the status file 1210 matches the digest 1221 of the status file. This processing is controlled to be performed before step S902 of the application management processing when the apparatus is started in FIG. 9, and before step S1001 of the program execution processing in FIG. 10. Also, if alteration of the digest file 1220 or the status file 1210 is detected, a pop-up screen 1301 as shown in FIG. 13 is displayed, and the use of the apparatus is restricted. Also, if a button 1302 for initializing an application is pressed, initialization processing of the application is executed, and the image processing apparatus can be restarted. Note that the configuration may be such that the alteration detection is performed with respect to, not limited to the status information, all files that are necessary for managing any application. As a result of configuring as described above, the alteration detection with respect to applications of the image processing apparatus can be made more robust.

Also, in the first embodiment described above, an example is shown in which only the login application 214 and the language switching application 215 are installed. However, this is merely an example, and the applications of the present invention are not limited thereto.

Also, in the first embodiment described above, if it cannot be determined whether or not an application including a program having a login attribute has been altered, the apparatus is controlled so as to behave similarly to the case where an application including a program having a login attribute has been altered. Specifically, if it is determined that the digest file has been altered (step S903), or the attribute file has been altered (step S904), in the application management processing when the apparatus is started, the same pop-up screen 701 is controlled to be displayed. Also, a message indicating that the program has been altered or the attribute file has been altered is controlled to be included in the pop-up screen 701. However, the configuration may be such that different messages are displayed between the case where it is determined that the program file has been altered (step S905) and the case where the digest file (step S903) or the attribute file (step S904) has been altered. In any case, the effects of the present invention can be obtained if the apparatus is only configured such that the use of the apparatus can be restricted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130887 filed on Jul. 10, 2018, which is hereby incorporated by reference herein in its entirety.

What is claimed is:

1. An image processing apparatus comprising:
   a display; and
   a controller including a processor and a memory, the controller configured to:
     set a login application to be enabled or disabled;
     cause a user authenticated by the login application which is set to be enabled to login the image processing apparatus and allow the authenticated user to use at least a function which can be operated via the display in accordance with the login;
     control the image processing apparatus so that the at least a function is not used in a case where alteration of the login application which is set to be enabled is detected; and
     control, without restricting use of the at least the function, the display to display a message indicating that alteration of an application is detected in a case where alteration of a specific application other than the login application is detected.

2. The image processing apparatus according to claim 1, wherein the controller is further configured not to perform detection of the alteration of the login application in a case where the login application is set to be disabled.

3. The image processing apparatus according to claim 1, wherein the controller is further configured to perform detection of the alteration of the login application using a hash value of a file of the login application.

4. The image processing apparatus according to claim 1, wherein the controller is further configured to perform detection of the alteration of the login application when activating the image processing apparatus.

5. The image processing apparatus according to claim 1, wherein the controller is further configured to perform detection of the alteration of the login application when the login application is switched from disabled to enabled.

6. An image processing apparatus comprising:
   a display; and
   a controller including a processor and a memory, the controller configured to:
     cause a user authenticated by a login application which is enabled to login the image processing apparatus and allow the authenticated user to use at least a function which can be operated via the display in accordance with the login;
     control the image processing apparatus so that the at least a function is not used in a case where alteration of the login application is detected; and
     control, without restricting use of the at least the function, the display to display a message indicating that alteration of an application is detected in a case where alteration of a specific application other than the login application is detected.

7. The image processing apparatus according to claim 6, wherein the controller is further configured to perform detection of the alteration of the login application using a hash value of a file of the login application.

8. The image processing apparatus according to claim 6, wherein the controller is further configured to perform detection of the alteration of the login application when activating the image processing apparatus.

9. The image processing apparatus according to claim 6, wherein the controller is further configured to perform detection of the alteration of the login application when the login application is switched from disabled to enabled.

10. The image processing apparatus according to claim 6, wherein the function includes at least one or more of a copy, a scan and a fax functions.

11. The image processing apparatus according to claim 6, wherein the controller is further configured to display, on the display, a message indicating that the alteration of the login application is detected in a case where the alteration of the login application is detected.

12. The image processing apparatus according to claim 6, wherein the controller is further configured to display, on the display, a message prompting to install the login application in a case where the alteration of the login application is detected.

13. The image processing apparatus according to claim 6, wherein the controller is further configured to disable the login application in a case where the alteration of the login application is detected.

14. The image processing apparatus according to claim 13, wherein the function includes at least one or more of a copy function, a scan function, and a fax function.

15. The image processing apparatus according to claim 13, wherein the controller is further configured to display, on the display, a message indicating that the alteration of the login application is detected in a case where the alteration of the login application is detected.

16. The image processing apparatus according to claim 13, wherein the controller is further configured to display, on the display, a message prompting to install the login application in a case where the alteration of the login application is detected.

17. The image processing apparatus according to claim 13, wherein the controller is further configured to disable the login application in a case where the alteration of the login application is detected.

18. The image processing apparatus according to claim 6, wherein the controller controls the image processing device so that the at least the function is not used in accordance with alternation of an attribute file indicating a type of an application is detected.

19. The image processing apparatus according to claim 18, wherein the attribute file includes a name of an application and version information of an application.

20. The image processing apparatus according to claim 6, wherein the controller controls the image processing device so that the at least the function is not used in accordance with alternation of a digest file including a digest of an attribute file indicating a type of an application is detected.

21. A control method of an image processing apparatus comprising
a display, the method comprising:
causing a user authenticated by a login application which is enabled to login the image processing apparatus and allowing the authenticated user to use at least a function which can be operated via the display in accordance with the login;
controlling the image processing apparatus so that the at least a function is not used in a case where alteration of the login application is detected; and
controlling, without restricting use of the at least the function, the display to display a message indicating that alteration of an application is detected in a case where alteration of a specific application other than the login application is detected.

22. A control method of an image processing apparatus comprising
a display, the method comprising:
setting a login application to be enabled or disabled;
causing a user authenticated by the login application which is set to be enabled to login the image processing apparatus and allowing the authenticated user to use at least a function which can be operated via the display in accordance with the login;
controlling the image processing apparatus so that the at least a function is not used in a case where alteration of the login application which is set to be enabled is detected; and
controlling, without restricting use of the at least the function, the display to display a message indicating that alteration of an application is detected in a case where alteration of a specific application other than the login application is detected.

23. A non-transitory computer-readable storage medium storing a computer program for causing a computer to execute steps of a control method of an image processing apparatus comprising a display, the method comprising:
causing a user authenticated by a login application which is enabled to login the image processing apparatus and allowing the authenticated user to use at least a function which can be operated via the display in accordance with the login;
controlling the image processing apparatus so that the at least a function is not used in a case where alteration of the login application is detected; and
controlling, without restricting use of the at least the function, the display to display a message indicating that alteration of an application is detected in a case where alteration of a specific application other than the login application is detected.

24. A non-transitory computer-readable storage medium storing a computer program for causing a computer to execute steps of a control method of an image processing apparatus comprising a display, the method comprising:
setting a login application to be enabled or disabled;
causing a user authenticated by a login application which is set to be enabled to login the image processing apparatus and allowing the authenticated user to use at least a function which can be operated via the display in accordance with the login;
controlling the image processing apparatus so that the at least a function is not used in a case where alteration of the login application which is set to be enabled is detected; and
controlling, without restricting use of the at least the function, the display to display a message indicating that alteration of an application is detected in a case where alteration of a specific application other than the login application is detected.

25. An image processing apparatus comprising:
a controller including a processor and a memory, the controller configured to:
set a login application to be enabled or disabled;
execute a login application which is set to be enabled;
control the image processing apparatus so that at least a function of the image processing apparatus is not used in accordance with alteration of the login application; and
control, without restricting use of the at least the function, the display to display a message indicating that alteration of an application is detected in a case where alteration of a specific application other than the login application is detected.

26. A control method of an image processing apparatus, the method comprising:
setting a login application to be enabled or disabled;
executing a login application which is set to be enabled;
controlling the image processing apparatus so that at least a function of the image processing apparatus is not used in accordance with alteration of the login application; and
controlling, without restricting use of the at least the function, the display to display a message indicating that alteration of an application is detected in a case where alteration of a specific application other than the login application is detected.

* * * * *